(12) United States Patent
Lin et al.

(10) Patent No.: US 9,208,404 B2
(45) Date of Patent: Dec. 8, 2015

(54) OBJECT DETECTION WITH BOOSTED EXEMPLARS

(71) Applicant: Adobe Systems Incorporated, San Jose, CA (US)

(72) Inventors: Zhe Lin, Fremont, CA (US); Jonathan W. Brandt, Santa Cruz, CA (US); Xiaohui Shen, San Jose, CA (US); Haoxiang Li, Hoboken, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/081,489

(22) Filed: Nov. 15, 2013

(65) Prior Publication Data

US 2015/0139538 A1    May 21, 2015

(51) Int. Cl.
*G06K 9/62* (2006.01)
*G06K 9/00* (2006.01)

(52) U.S. Cl.
CPC .......... *G06K 9/6269* (2013.01); *G06K 9/00288* (2013.01)

(58) Field of Classification Search
CPC .................. G06K 9/6269; G06K 9/00288
USPC ........ 382/159; 706/18–21, 25–26; 700/47–48
See application file for complete search history.

(56) References Cited

U.S. PATENT DOCUMENTS

| | | | |
|---|---|---|---|
| 5,819,247 A * | 10/1998 | Freund et al. | 706/25 |
| 6,453,307 B1 * | 9/2002 | Schapire et al. | 706/12 |
| 7,024,033 B2 * | 4/2006 | Li et al. | 382/159 |
| 7,634,142 B1 | 12/2009 | Bourdev et al. | |
| 7,769,228 B2 * | 8/2010 | Bahlmann et al. | 382/155 |
| 7,822,696 B2 | 10/2010 | Zhang et al. | |
| 8,515,139 B1 * | 8/2013 | Nechyba et al. | 382/118 |
| 2003/0108244 A1 | 6/2003 | Li et al. | |
| 2003/0200188 A1 * | 10/2003 | Moghaddam | 706/25 |
| 2008/0187213 A1 * | 8/2008 | Zhang et al. | 382/159 |
| 2008/0298643 A1 * | 12/2008 | Lawther et al. | 382/118 |
| 2008/0310737 A1 * | 12/2008 | Han et al. | 382/224 |
| 2009/0018981 A1 * | 1/2009 | Zhang et al. | 706/12 |
| 2009/0116693 A1 | 5/2009 | Yamamoto et al. | |
| 2009/0125473 A1 | 5/2009 | Amini et al. | |

(Continued)

OTHER PUBLICATIONS

Schapire, Robert E., et al., "Improved Boosting Algorithms Using Confidence-rated Predictions", *Mach. Learn.*, 37(3):297-336, Dec. 1999., 40 pages.

(Continued)

*Primary Examiner* — Samir Ahmed
(74) *Attorney, Agent, or Firm* — Wolfe-SMBC

(57) ABSTRACT

In techniques for object detection with boosted exemplars, weak classifiers of a real-adaboost technique can be learned as exemplars that are collected from example images. The exemplars are examples of an object that is detectable in image patches of an image, such as faces that are detectable in images. The weak classifiers of the real-adaboost technique can be applied to the image patches of the image, and a confidence score is determined for each of the weak classifiers as applied to an image patch of the image. The confidence score of a weak classifier is an indication of whether the object is detected in the image patch of the image based on the weak classifier. All of the confidence scores of the weak classifiers can then be summed to generate an overall object detection score that indicates whether the image patch of the image includes the object.

20 Claims, 6 Drawing Sheets

(56) References Cited

U.S. PATENT DOCUMENTS

| | | | |
|---|---|---|---|
| 2010/0014758 A1 | 1/2010 | Yano et al. | |
| 2010/0055654 A1* | 3/2010 | Yokono et al. | 434/155 |
| 2010/0128993 A1 | 5/2010 | Sebe et al. | |
| 2010/0293207 A1 | 11/2010 | Parthasarathy et al. | |
| 2010/0296740 A1 | 11/2010 | Mise | |
| 2010/0329544 A1* | 12/2010 | Sabe et al. | 382/159 |
| 2011/0188737 A1* | 8/2011 | Prokhorov et al. | 382/154 |
| 2012/0076408 A1 | 3/2012 | Suk et al. | |
| 2012/0243734 A1 | 9/2012 | Greig | |
| 2015/0139551 A1 | 5/2015 | Lin et al. | |

OTHER PUBLICATIONS

Shen, Xiahui et al., "Detecting and Aligning Faces by Image Retrieval", *CVPR*, 2013, pp. 4321-4328.

Zhu, Xiangxin et al., "Face Detection, Pose Estimation, and Landmark Localization in the Wild", *2012 IEEE Conference on Computer Vision and Pattern Recognition*, 8 pages.

"Restriction Requirement", U.S. Appl. No. 14/081,577, May 21, 2015, 6 pages.

"Pre-Interview Communication", U.S. Appl. No. 14/081,577, Aug. 31, 2015, 3 pages.

* cited by examiner

OBJECT DETECTION WITH BOOSTED EXEMPLARS

BACKGROUND

Conventional approaches to detect objects in digital images, such as to detect faces in an image, generally utilize a model-training approach to develop discriminative classifiers off-line, and then scan an image in multiple region segments comparing the discriminative classifiers of the trained model to faces or other objects in the image. A current exemplar-based face detector models faces using a set of exemplars directly, and to detect faces in an image, every exemplar is applied as an individual voting map over the image. The individual voting maps are aggregated after thresholding to build an overall voting map for the image, and then the location of faces in the image can be located by detecting peaks in the overall voting map. An advantage of this exemplar-based face detector is its robustness to large appearance variations. However, despite the effectiveness, a large number of exemplars are needed by the exemplar-based face detector, which makes it unpractical for use in terms of processing speed and memory used to compute the large number of exemplars.

SUMMARY

This Summary introduces features and concepts of object detection with boosted exemplars, which is further described below in the Detailed Description and/or shown in the Figures. This Summary should not be considered to describe essential features of the claimed subject matter, nor used to determine or limit the scope of the claimed subject matter.

Object detection with boosted exemplars is described. In embodiments, weak classifiers of a real-adaboost technique can be learned as exemplars that are collected from example images, where the exemplars are examples of an object that is detectable in the image patches of an image. The weak classifiers of the real-adaboost technique can also include negative exemplars that do not include the object. The weak classifiers of the real-adaboost technique can be applied to the image patches of the image, and a confidence score is determined for each of the weak classifiers as applied to an image patch of the image. A similarity score is generated for each of the weak classifiers when each weak classifier is applied to the image patch of the image, and the confidence score for a weak classifier can be determined based on the respective similarity score generated for the weak classifier. The confidence score of a weak classifier is an indication of whether the object is detected in the image patch of the image based on the weak classifier. All of the confidence scores of the weak classifiers can then be summed to generate an overall object detection score that indicates whether the image patch of the image includes the object.

In implementations, the object is representative of faces that are detectable in the image patches of the image, and the exemplars are example faces taken from the example images. The confidence score for each of the weak classifiers is an indication of whether a face of a person is detected in an image patch of the image. Additionally, faces are detectable in the image patches of an image when variations in pose, illumination, expression, and individuality based on the exemplars taken from the example images and applied as the weak classifiers of the adaboost technique.

In embodiments, the exemplars can be partitioned as domain-partitioned weak classifiers of the adaboost technique. The confidence score of a weak classifier that is domain-partitioned is determined from a coefficient of the partitions of the weak classifier, where a higher confidence score indicates that the object is detected in the image patch based on the weak classifier, and a lower confidence score indicates that the object is not detected in the image patch based on the weak classifier. In implementations, each of the weak classifiers is partitioned into three partitions that each have an associated confidence score, which include: a positive confidence score that indicates the object is detected in the image patch; a negative confidence score that indicates the object is not detected in the image patch; and an uncertain confidence score that indicates uncertainty as to whether the object is detected in the image patch.

BRIEF DESCRIPTION OF THE DRAWINGS

Embodiments of object detection with boosted exemplars are described with reference to the following Figures. The same numbers may be used throughout to reference like features and components that are shown in the Figures.

DETAILED DESCRIPTION

Embodiments of object detection with boosted exemplars are described as a real-adaboost technique that learns a sequence of representative exemplar object instances as weak classifiers, and uses the learned exemplars to perform detection for a new image. For example, the representative exemplar object instances may be faces that can be detected in digital images. Adaboost is a common term for "adaptive boosting" which can be implemented as a machine-learning algorithm or technique. In embodiments described herein, real-adaboost technique is applied to an exemplar-based model to learn weak classifiers as exemplars collected from example images, such as example faces or other objects that are then detectable when the weak classifiers are applied to digital images.

The weak classifiers of the real-adaboost technique can be applied to image patches of images, and a confidence score is determined for each of the weak classifiers as applied to an image patch of an image. A similarity score is generated for each of the weak classifiers when each weak classifier is applied to an image patch of the image, and the confidence score for a weak classifier can be determined based on the respective similarity score generated for the weak classifier. The confidence score of a weak classifier is an indication of whether the face of a person is detected in the image patch of the image based on the weak classifier. All of the confidence scores of the respective weak classifiers can then be summed to generate an overall object detection score that indicates whether the image includes the face of a person.

The techniques for object detection with boosted exemplars described herein provide significant processing speed and performance improvements, as well being able to account for view and pose variations of people in images for face detection. The faces are detectable in the images even when variations in pose, illumination, expression, individuality, and other factors are different based on the exemplars taken from the example images and applied as the weak classifiers of the adaboost technique. A standard adaboost technique or a real-adaboost technique may be implemented for object detection with boosted exemplars. As described herein, a real-adaboost technique is implemented that utilizes a fewer number of weak classifiers, allows general domain partitioning of the weak classifiers, and real-valued scores can be assigned for each partition, such as the confidence scores for each weak classifier that indicate whether the face of a person is detected in an image.

While features and concepts of object detection with boosted exemplars can be implemented in any number of different devices, systems, networks, environments, and/or configurations, embodiments of object detection with boosted exemplars are described in the context of the following example devices, systems, and methods.

Figure 1:
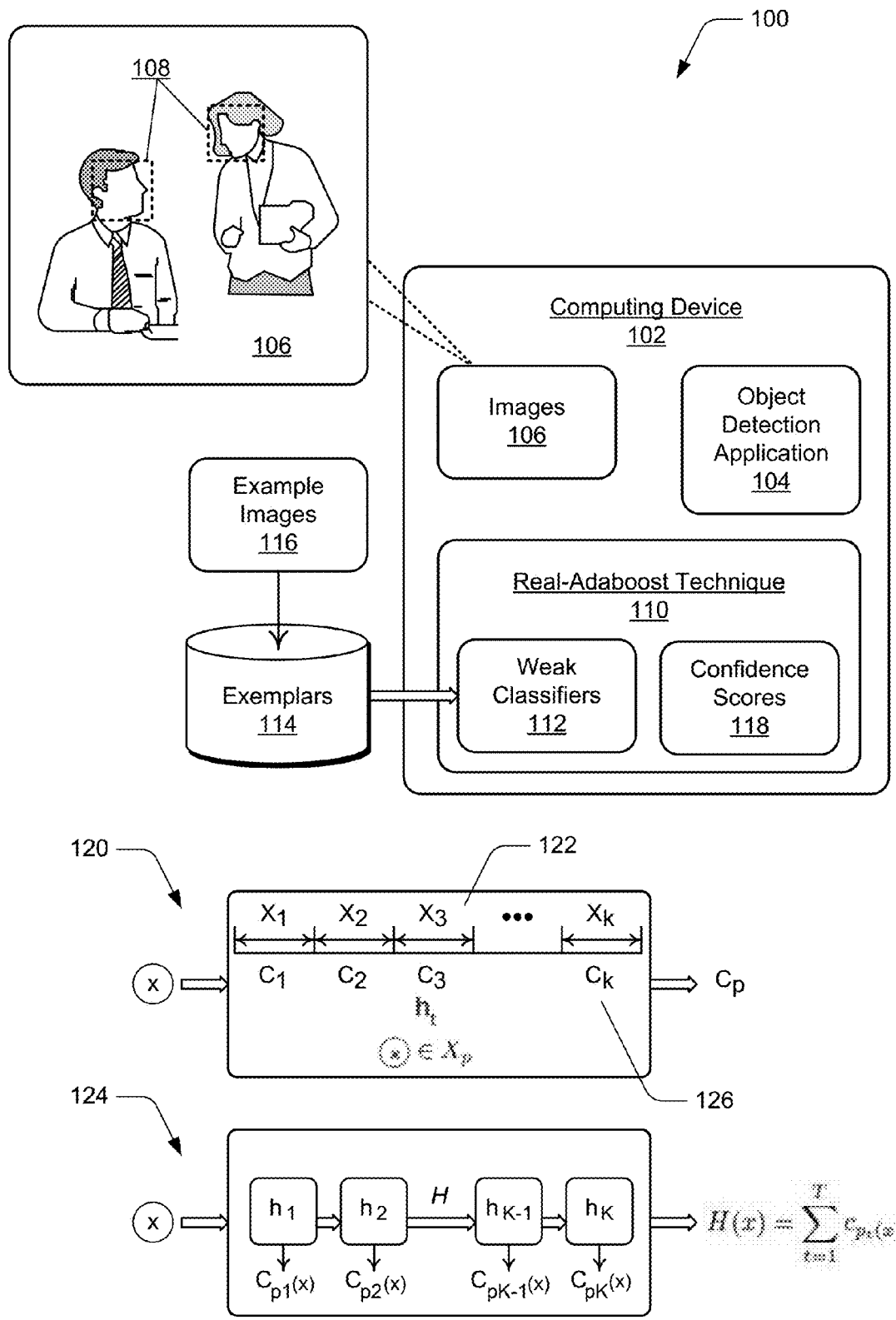
FIG. 1 illustrates an example of a device that implements an object detection application to implement a real-adaboost technique in accordance with one or more embodiments of object detection with boosted exemplars.

FIG. 1 illustrates an example 100 of a computing device 102 that implements an object detection application 104 to detect objects, such as faces, in images 106 in embodiments of object detection with boosted exemplars. The images 106 can be any type of digital images, which can be displayed on a display device of a computing system or device. The images 106 can be displayed on any type of display device that is connected to, or integrated with, the computing device 102, such as any type of computer, mobile phone, tablet device, digital camera, or any other electronic media device that implements the object detection application 104 (e.g., a software application) in embodiments of object detection with boosted exemplars. An image 106 can include varying features, objects, and regions of the image, and as described herein, faces 108 of one or more persons that are detectable in the image by the object detection application 104.

In implementations, the object detection application 104 is implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 6.

In embodiments, the object detection application 104 implements a real-adaboost technique 110 in an exemplar-based model to learn weak classifiers 112 as exemplars 114 that are collected from example images 116, such as exemplars that are example faces or other objects that are then detectable when applied to the images 106. The weak classifiers 112 of the real-adaboost technique 110 can also include negative exemplars, such as taken from example images that do not include faces. The object detection application 104 can apply the weak classifiers 112 of the real-adaboost technique to image patches of an image 106, and a confidence score 118 is determined for each of the weak classifiers as applied to an image patch of the image.

A similarity score can be generated for each of the weak classifiers 112 when applying each of the weak classifiers to the image patch of the image, and the confidence score 118 for a weak classifier can be determined based on the respective similarity score generated for the weak classifier. The confidence score of a weak classifier is an indication of whether the object is detected in the image patch of the image based on the weak classifier. The object detection application 104 can then sum all of the confidence scores 118 of the weak classifiers 112 to generate an overall object detection score that indicates whether the image patch of the image includes the object, such as one or more faces in an image.

In an implementation of an exemplar-based face detector, an exemplar t is a set of low-level feature descriptors used to measure the similarity scores between the exemplar t and an image 106. Given an image patch x in an image I and an exemplar face t, the object detection application 104 generates a voting map over the image 106 to detect faces at the correct scale. A value at the center of the image patch x in the voting map is the similarity score between the exemplar face t and the image patch x, and this similarity score is denoted as $f_t(x)$. In a real-adaboost framework, the exemplar face t is a domain-partitioned, confidence-rated weak classifier $h_t(x)$, which rates the confidence that an image patch x is (or might be) a face.

As shown at 120, a domain F of $h_t(x)$ can be partitioned into K partitions 122, i.e., $F = X_{t_1} \cup X_{t_2} \cup \ldots \cup X_{t_{K-1}} \cup X_{t_K}$, where the confidences for the K partitions are $\{C_{t_k}\}_{k=1}^{K}$, as shown at 124. A domain-partitioned, confidence-rated weak classifier is $h_t(x) = C_{t_k}$, for $x \in X_{t_k}$. Rather than defining different partitions of F as the weak classifiers, a fixed partition 122 for the domain of $\{f_t(x)\}_{t=1}^{T}$ is manually assigned so that the domain $R^+$ of $\{f_t(x)\}_{t=1}^{T}$ is partitioned into the K partitions, i.e., $R^+ = F_1 \cup F_2 \cup \ldots \cup F_K$, which is independent to the exemplar t.

In embodiments, the exemplars can be partitioned as domain-partitioned weak classifiers 112 of the real-adaboost technique 110, as shown at 120 and 124. The confidence score of a weak classifier that is domain-partitioned is determined from a coefficient 126 of the partitions of the weak classifier, where a higher confidence score indicates that the object is detected in the image patch based on the weak classifier, and a lower confidence score indicates that the object is not detected in the image patch based on the weak classifier. In implementations, each of the weak classifiers 112 are partitioned into three partitions 122 that each have an associated confidence score, which include: a positive confidence score that indicates the object is detected in the image patch; a negative confidence score that indicates the object is not detected in the image patch; and an uncertain confidence score that indicates uncertainty as to whether the object is detected in the image patch.

Figure 2:
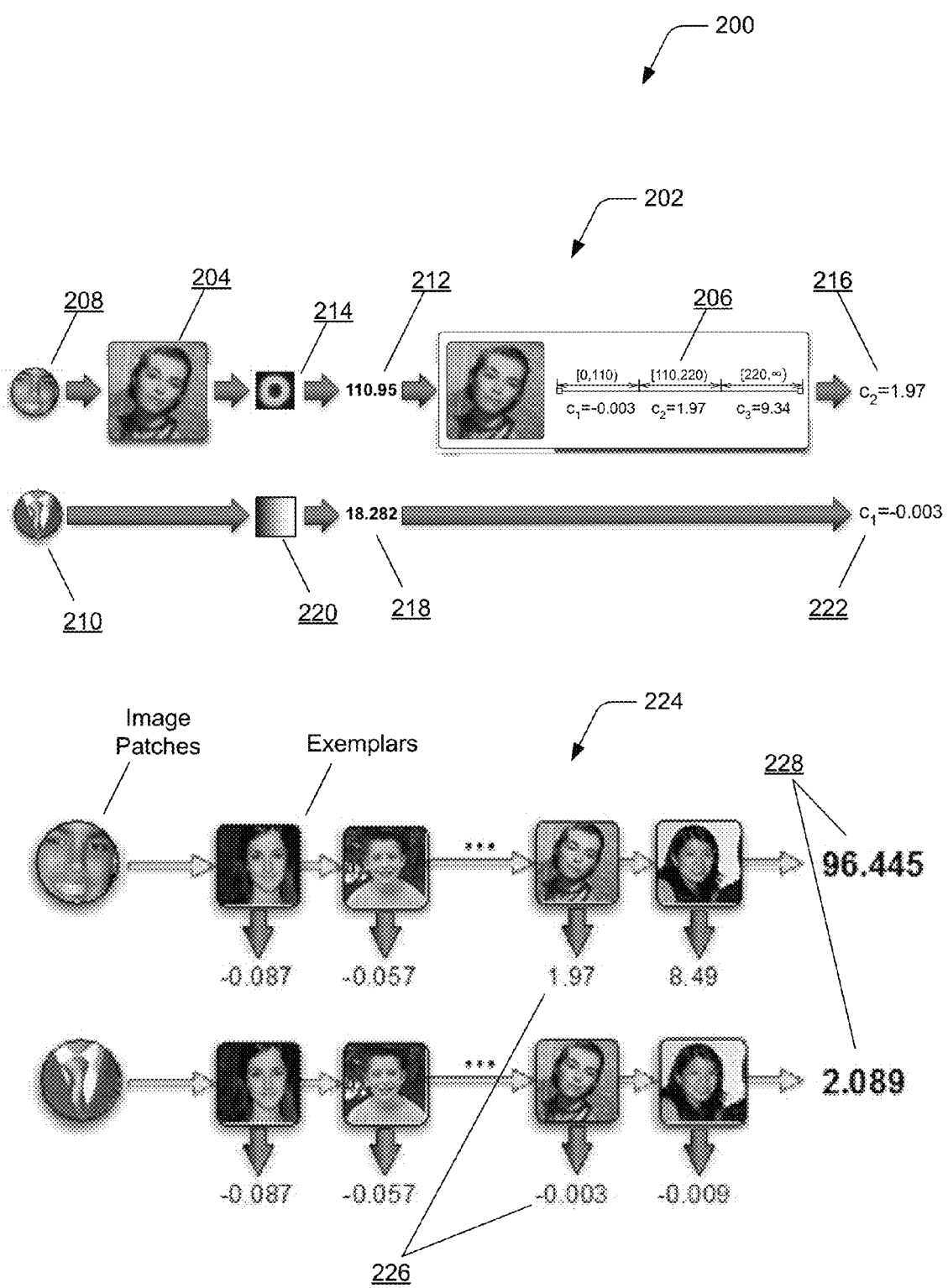
FIG. 2 illustrates examples of the real-adaboost technique as implemented by the object detection application in accordance with one or more embodiments of object detection with boosted exemplars.

FIG. 2 illustrates examples 200 of the real-adaboost technique 110 that is implemented by the object detection application 104 at the computing device 102, as described with reference to FIG. 1. As shown at 202, an exemplar face 204 that is used as a weak classifier 112 has a different rated confidence (e.g., $c_1$, $c_2$, or $c_3$) when the similarity scores (e.g., based on respective voting maps) of two different image patches fall into different partitions 206 of the weak classifier. For example, a first image patch 208 is shown as a face that can be detected in an image 106, and a second image patch 210 of the image does not include a face. The similarity score 212 based on the voting map 214 for the first image patch 208 results in a rated confidence 216 (e.g., $c_2 = 1.97$), and the similarity score 218 based on the voting map 220 for the second image patch 210 results in a rated confidence 222

(e.g., $c_1=-0.003$). In implementations, the number of partitions 206 can be set at three (i.e., K=3) and the partitions are uniform across all of the exemplars 114. In this example, the three partitions 206 correlate to a range of the similarity scores, such as the similarity scores 212 and 218 that are generated from the respective voting maps 214 and 220 for the exemplar face 204.

If the similarity score that is generated from an exemplar is between (0, 110) in this example, then the confidence $c_1$ is nearly zero (−0.003) that the image patches 208 or 210 include a face, based on the weak classifier that is the exemplar face 204. If the similarity score that is generated from an exemplar is between (110, 220), then the confidence $c_2$ is (1.97), which indicates uncertainty as to whether the image patches 208 or 210 include a face, based on the weak classifier that is the exemplar face 204. If the similarity score that is generated from an exemplar is (220, ∞), then the confidence $c_3$ is (9.34), which indicates that an image patch 208 or 210 likely includes a face, based on the weak classifier that is the exemplar face 204. When the number of partitions 206 are fixed, or set, any initial similarity score less than 110 will result in the near zero confidence score ($c_1=-0.003$), which can be disregarded, saving computation processing and resources.

Given a set of exemplars $h_1(x), h_2(x), \ldots, h_T(x)$ and the training examples $\phi=\{x_i, y_i\}$, $i=1, \ldots, N, y_i \in \{-1, +1\}$, the object detection application 104 selects the weak classifiers and learns the confidence-ratings as described below. Given an image patch x, the M stages real-adaboost classifiers predict x as a face with a confidence of H(x), where:

$$H(x) = \sum_{m=1}^{M} h_{\hat{m}}(f_{\hat{m}}(x)).$$

As shown at 224, the confidence scores 226 from the weak classifiers are aggregated as the final confidence scores 228 (also referred to as the object detection scores) for the image patches 208 and 210. The final confidence scores 228 indicate whether an image patch of an image includes a face or not. For example, the higher score (96.445) indicates that the image patch 208 of the image is a detected face, whereas the lower score (2.089) indicates that the image patch 210 is not a detected face.

The training process of the real-adaboost technique 110 includes an input of the exemplars 114, initializing example scores and weights, iterative learning, and an output of the weak classifiers 112, as described in the following:

Input: Exemplars $h_1(x), h_2(x), \ldots, h_T(x)$ and the training data $\phi=\{x_i, y_i\}$, $i=1, \ldots, N$, $y_i \in \{-1, +1\}$, as well as the expected number of weak classifiers M.

Initialize the example scores and weights as:

$$s_i = \log\left(\frac{N_{pos}}{N_{neg}}\right), \omega_i = \frac{1}{1+e^{y_i s_i}}$$

Iterative learning, for m=1 ... M:
1. Calculate the Z score for weak classifiers, where $$Z_t = 2\sum_k \sqrt{W_+^k W_-^k}$$

-continued $$W_+^k = \sum_{i: f_t(x_i) \in F_k \wedge y_i=+1} \omega_i$$

$$W_-^k = \sum_{i: f_t(x_i) \in F_k \wedge y_i=-1} \omega_i$$

$$c_{t_k} = \frac{1}{2}\log\left(\frac{W_+^k + \epsilon}{W_-^k + \epsilon}\right)$$

2. Select the best weak classifier:

$\hat{m} = \arg\min_t Z_t, \hat{h}_m(x) = h_{\hat{m}}(x)$

3. Update the examples weights:

$$s_i = \log\left(\frac{N_{pos}}{N_{neg}}\right) + \sum_{j=1}^{m} \hat{h}_j(x_i), \omega_i = \frac{1}{1+e^{y_i s_i}}$$

Output: Weak classifiers $\hat{h}_m(x)=h_{\hat{m}}(x)$, m=1, ..., M and associated confidences $c_{\hat{m}_1}, c_{\hat{m}_2}, \ldots, c_{\hat{m}_K}$.

In implementations, exemplar faces are collected from the example images 116 as positive training examples. Negative training examples, such as exemplars without faces, can also be collected by uniformly sampling from negative images, and by boot-strapping. The image patches of an image 106 can be collected having different sizes with different spacing as the uniform extraction. After collecting the negative examples uniformly, the real-adaboost framework for exemplar-based face detection can be trained. After training an initial real-adaboost framework, the exemplar-based face detector with the real-adaboost framework can be applied on the same set of negative images. All of the detected regions are regarded as the negative examples from bootstrapping, which in general, can be used to find more challenging negative examples to force the learned real-adaboost classifier to be stronger. In implementations, the training (e.g., for selection of the exemplars, the weak classifiers learning, and the real-adaboost learning) and the testing (e.g., detecting faces in the images) utilizes an efficient voting-based retrieval method, which provides that the similarity determinations of one or all of the image patches to the exemplars can be batch computed very efficiently.

In terms of training the real-adaboost weak classifiers, additional features may be utilized to further improve the detection performance. First, as described above, negative images can be added as candidate exemplars in the training stage, which are constructed as negative exemplars to suppress false alarms in detection by real-adaboost automatically. Second, additional representative hard negative examples can be added in the training stage to further suppress false alarms, such as human bodies. Third, a long-term classifier learning process can be built to keep collecting negative images and exemplar faces, and iteratively adding detected hard negative examples into the training pool. Additionally, the detection performance can be improved by using more discriminative similarity scores. Any improvement within the scope of the exemplar-based face detector could produce more distinctive similarity scores, and benefit detection of the proposed real-adaboost framework.

Figure 3:
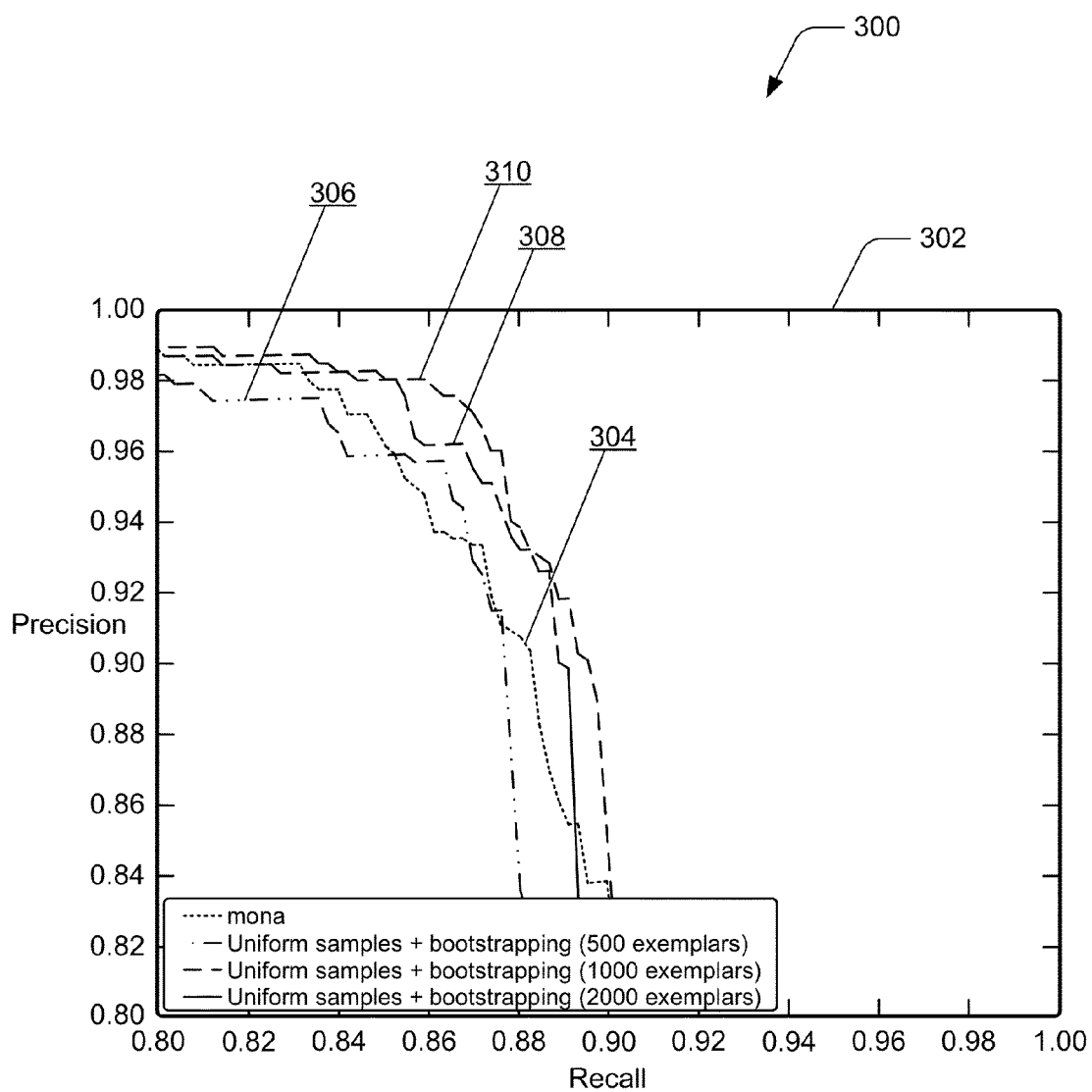
FIG. 3 illustrates an example of results utilizing the real-adaboost technique and exemplar-based model for face detection in accordance with one or more embodiments of object detection with boosted exemplars.

FIG. 3 illustrates an example 300 of a results chart 302 utilizing the real-adaboost technique 110 in an exemplar-based model for face detection. As noted above, the partitions of all of the weak classifiers are set uniform K=3, where $F_1=[0, 110)$, $F_2=[110, 220)$, and $F_3=[220, \infty)$. In an implementation, 15,832 positive examples are collected exemplars from 1,000,000 uniformly sampled examples, 60,000 bootstrapping examples are used, and the top exemplars that are selected by the real-adaboost framework as described above are diverse and representative. The results chart 302 illustrates application of the technique for object detection with boosted exemplars on a dataset (i.e., the UCI-AFW dataset), and with 1,000 to 2,000 exemplars, the proposed technique outperforms current state-of-the-art face detectors by a significant margin around the operation point on the precision-recall curve. The results of the conventional technique are shown at 304 in the results chart (e.g., such as with 8,000 exemplars), whereas the improved results for 500 exemplars is shown at 306, the improved results for 1,000 exemplars is shown at 308, and the improved results for 2,000 exemplars is shown at 310 in the results chart. The technique for object detection with boosted exemplars may use only a quarter of the exemplars, yet yield faster and more accurate results. Additional hard negative examples in the training stage can also be utilized to train a stronger real-adaboost classifier.

Example method 400 is described with reference to FIG. 4 in accordance with one or more embodiments of object detection with boosted exemplars. Generally, any of the services, components, modules, methods, and operations described herein can be implemented using software, firmware, hardware (e.g., fixed logic circuitry), manual processing, or any combination thereof. The example method may be described in the general context of executable instructions stored on a computer-readable storage memory that is local and/or remote to a computer processing system, and implementations can include software applications, programs, functions, and the like.

Figure 4:
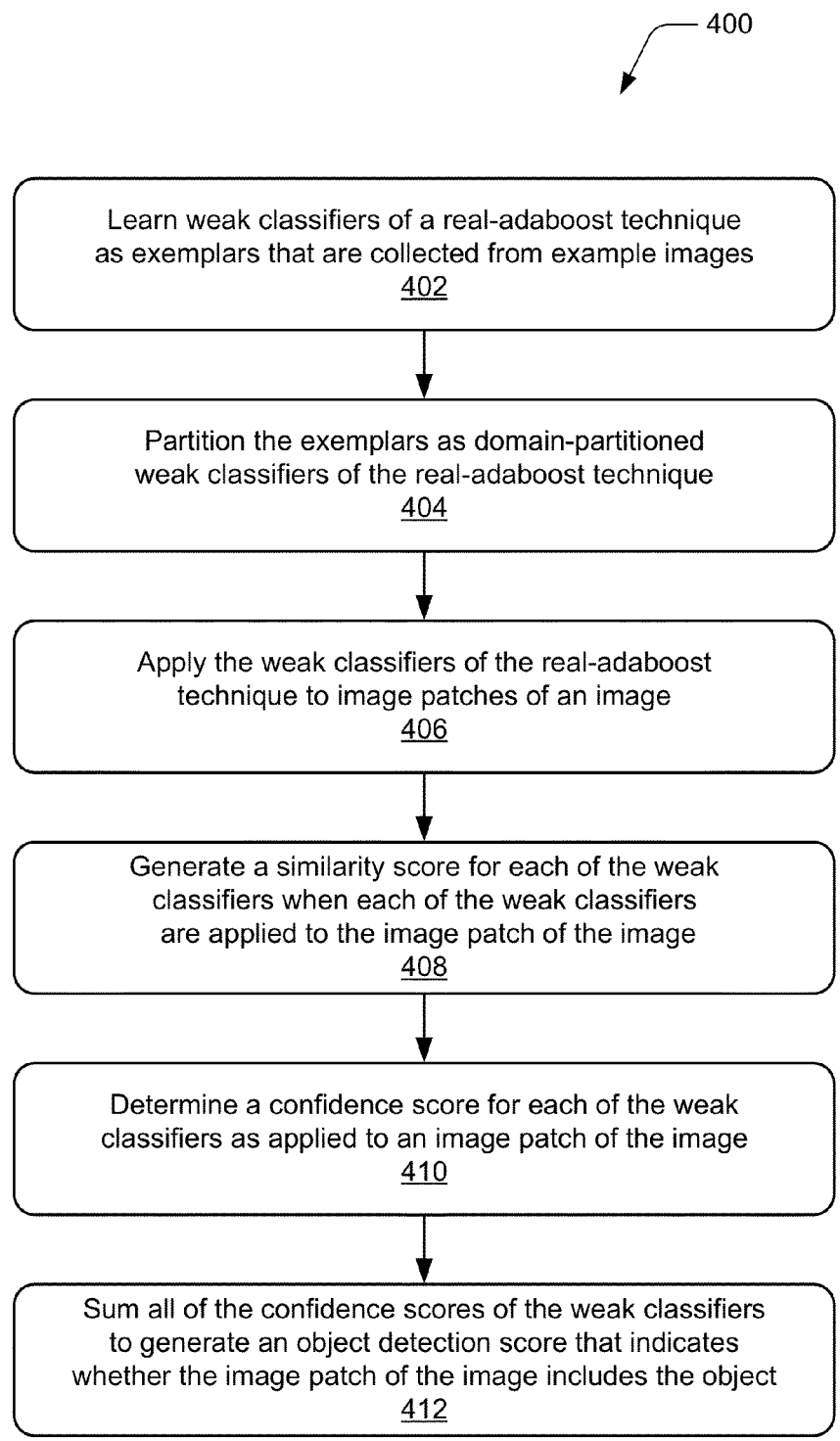
FIG. 4 illustrates example method(s) of object detection with boosted exemplars in accordance with one or more embodiments.

FIG. 4 illustrates example method(s) 400 of object detection with boosted exemplars, and is generally described with reference to an object detection application implemented by a computing device. The order in which the method is described is not intended to be construed as a limitation, and any number or combination of the method operations can be combined in any order to implement a method, or an alternate method.

At 402, weak classifiers of a real-adaboost technique are learned as exemplars that are collected from example images. For example, the object detection application 104 (FIG. 1) that is implemented by the computing device 102 (or implemented at a cloud-based data service as described with reference to FIG. 5) learns the weak classifiers 112 of the adaboost technique 110 as the exemplars 114 that are collected from the example images 116. The weak classifiers 112 are the exemplars 114 taken from the example images 116 as examples of an object that is detectable in image patches of digital images 106. In implementations, the object is representative of faces that are detectable in the image patches of the images, and the exemplars are example faces taken from the example images. Additionally, one or more of the weak classifiers 112 of the real-adaboost technique 110 are learned as negative exemplars that do not include the object, such as exemplars that do not include an example face.

At 404, the exemplars are partitioned as domain-partitioned weak classifiers of the real-adaboost technique. For example, the object detection application 104 partitions the exemplars 114 as domain-partitioned weak classifiers of the real-adaboost technique 110. In implementations, each of the weak classifiers 112 are partitioned into three partitions (i.e., K=3) that each have an associated confidence score, which include: a positive confidence score that indicates the object is detected in an image patch of an image; a negative confidence score that indicates the object is not detected in the image patch of the image; and an uncertain confidence score that indicates uncertainty as to whether the object is detected in the image patch of the image.

At 406, the weak classifiers of the real-adaboost technique are applied to image patches of an image and, at 408, a similarity score is generated for each of the weak classifiers when each of the weak classifiers are applied to the image patch of the image. For example, the object detection application 104 applies the weak classifiers 110 of the real-adaboost technique 110 to the image patches 208 and 210 of an image 106, and the respective similarity scores 212 and 218 are generated for each of the weak classifiers.

At 410, a confidence score is determined for each of the weak classifiers as applied to an image patch of the image. For example, the object detection application 104 determines a confidence score (e.g., $c_1$, $c_2$, or $c_3$) for each of the weak classifiers 112 as applied to the image patches 208 and 210 of the image 106. The confidence score of a weak classifier is an indication of whether the object, such as a face of a person, is detected in the image patch of the image based on the weak classifier. The confidence score for a weak classifier can be based on the respective similarity score that is generated for the weak classifier. Additionally, the confidence score of a weak classifier that is domain-partitioned can be determined from a coefficient of the partitions of the weak classifier, where a higher confidence score indicates that the object is detected in the image patch based on the weak classifier, and a lower confidence score indicates that the object is not detected in the image patch based on the weak classifier.

At 412, all of the confidence scores of the weak classifiers are summed to generate an object detection score that indicates whether the image patch of the image includes the object. For example, the object detection application 104 sums all of the confidence scores of the weak classifiers 112 to generate an overall object detection score 228 that indicates whether the image patch of the image includes the object. The final confidence scores 228 (FIG. 2) indicate whether the image patches 208 and 210 of an image includes a face or not. For example, the higher object detection score (96.445) indicates that the image patch 208 is a detected face, whereas the lower object detection score (2.089) indicates that the image patch 210 is not a detected face. In embodiments of object detection with boosted exemplars, the faces are detectable in the image patches of the images even though the faces may vary in pose, illumination, expression, and/or individuality based on the exemplars taken from the example images and applied as the weak classifiers of the adaboost technique.

Figure 5:
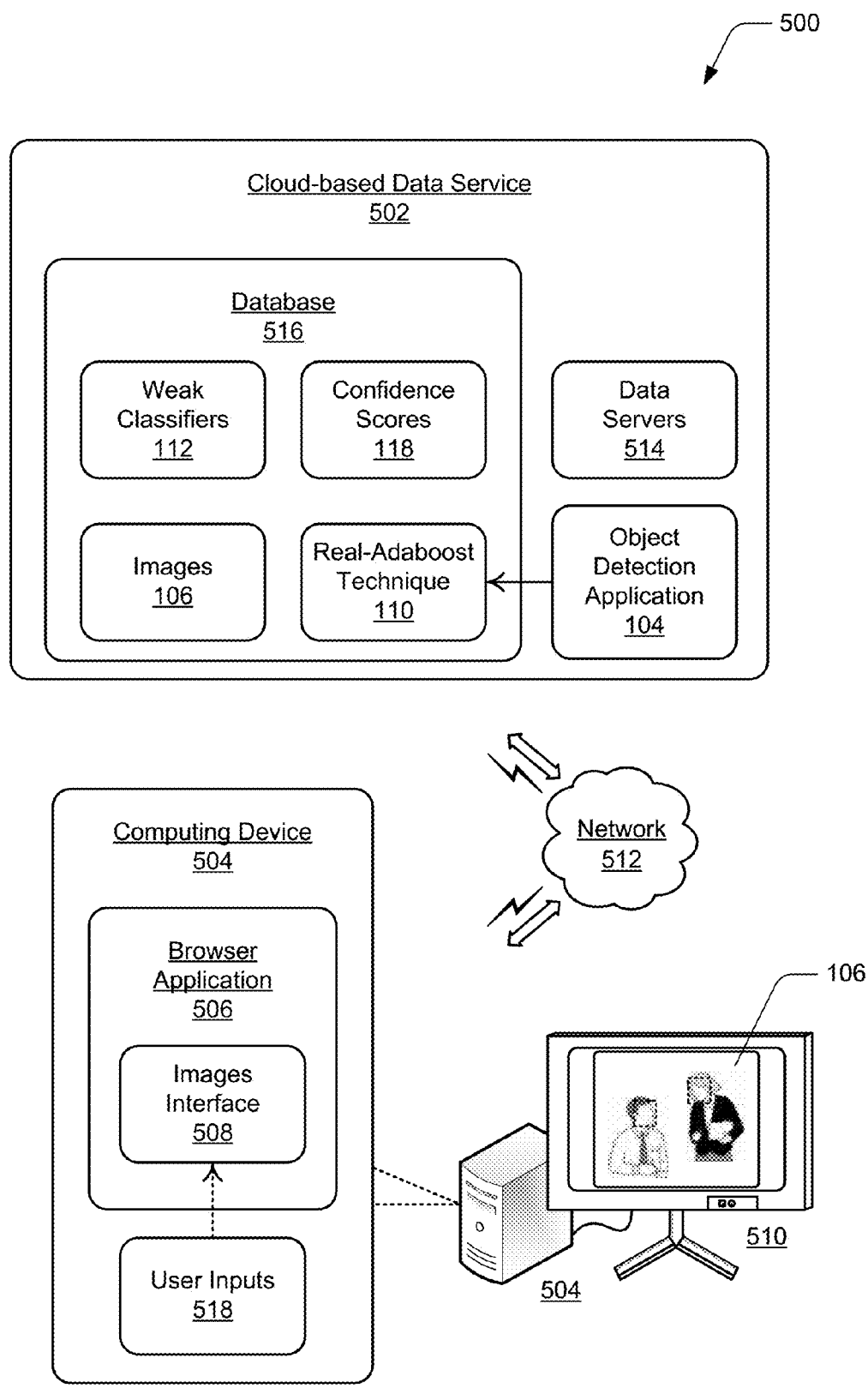
FIG. 5 illustrates an example system in which embodiments of object detection with boosted exemplars can be implemented.

FIG. 5 illustrates an example system 500 in which embodiments of object detection with boosted exemplars can be implemented. The example system 500 includes a cloud-based data service 502 that a user can access via a computing device 504, such as any type of computer, mobile phone, tablet device, and/or other type of computing device. The computing device 504 can be implemented with a browser application 506 through which a user can access the data service 502 and initiate a display of an images interface 508 to display images, such as the image 106 also shown on a display device 510 that is connected to the computing device. The computing device 504 can be implemented with various components, such as a processing system and memory, and with any number and combination of differing components as further described with reference to the example device shown in FIG. 6.

In embodiments of object detection with boosted exemplars, the cloud-based data service 502 is an example of a network service that provides an on-line, Web-based version of the object detection application 104 that a user can log into from the computing device 504 and display the images interface 508. The network service may be utilized for any type of image editing and processing, to include illustration editing, video compositing and editing, graphics and page layouts, animation, and any other type of application user interface. The data service can also maintain and/or upload the image 106 that is displayable in the images interface 508.

Any of the devices, data servers, and networked services described herein can communicate via a network 512, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 502 includes data servers 514 that may be implemented as any suitable memory, memory device, or electronic data storage for network-based data storage, and the data servers communicate data to computing devices via the network 512. The data servers 514 maintain a database 516 of the user images (e.g., the images 106), as well as the real-adaboost technique 110 that is implemented by the object detection application 104. The database 516 can also include the weak classifiers 112 and the confidence scores 118 that are generated by the object detection application 104 and utilized in the real-adaboost technique 110.

The cloud-based data service 502 includes the object detection application 104, such as a software application (e.g., executable instructions) that is executable with a processing system to implement embodiments of object detection with boosted exemplars. The object detection application 104 can be stored on a computer-readable storage memory, such as any suitable memory, storage device, or electronic data storage implemented by the data servers 514. Further, the data service 502 can include any server devices and applications, and can be implemented with various components, such as a processing system and memory, as well as with any number and combination of differing components as further described with reference to the example device shown in FIG. 6.

The data service 502 communicates images data and the images interface 508 of the object detection application 104 to the computing device 504 where the images interface is displayed, such as through the browser application 506 and displayed on the display device 510 of the computing device. The object detection application 104 can also receive user inputs 518 to the images interface 508, such as when a user at the computing device 504 initiates a user input with a computer input device or as a touch input on a touchscreen to initiate face detection in an image. The computing device 504 communicates the user inputs 520 to the data service 502 via the network 512, where the object detection application 104 receives the user inputs.

Figure 6:
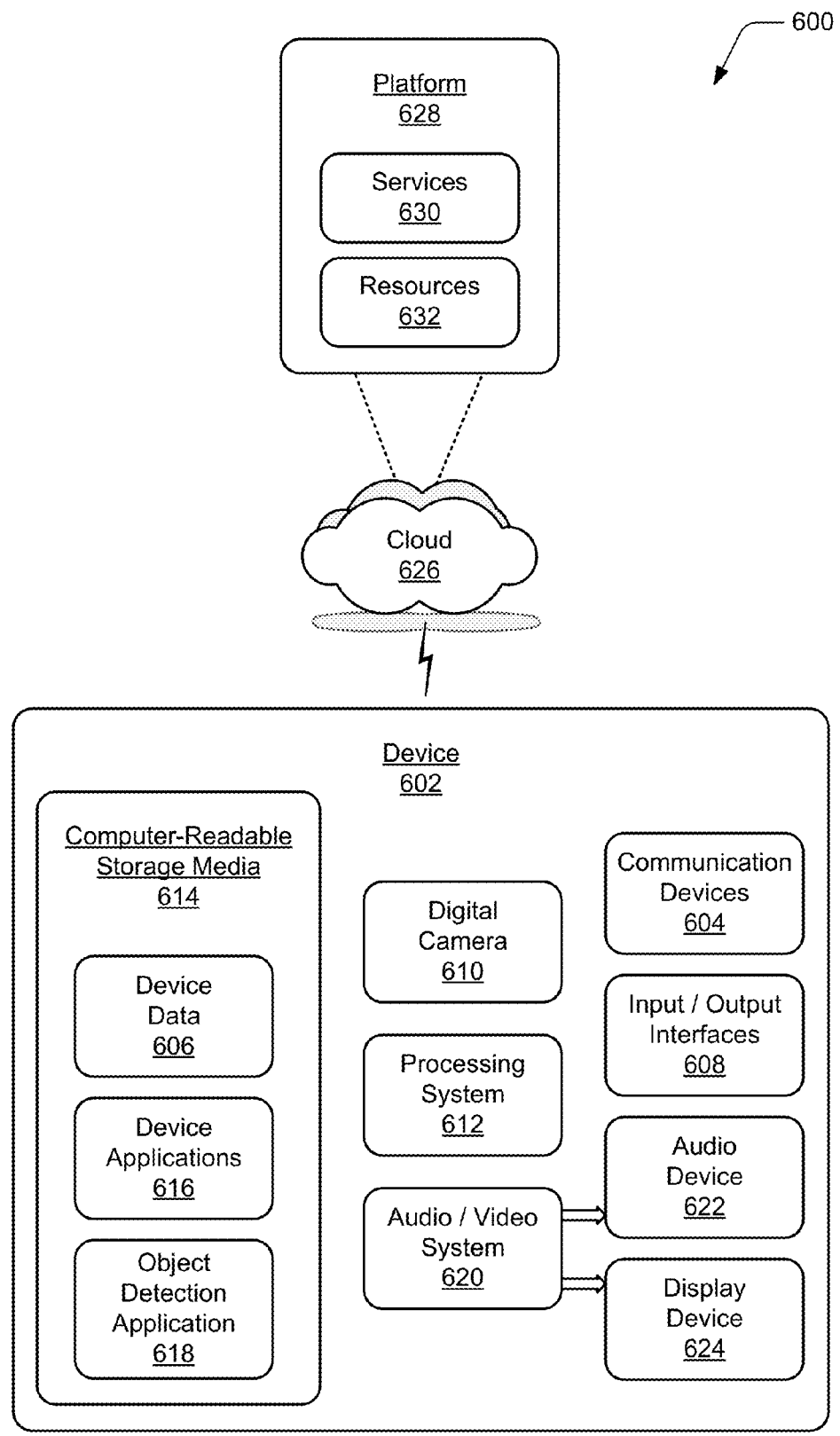
FIG. 6 illustrates an example system with an example device that can implement embodiments of object detection with boosted exemplars.

FIG. 6 illustrates an example system 600 that includes an example device 602, which can implement embodiments of object detection with boosted exemplars. The example device 602 can be implemented as any of the devices and/or server devices described with reference to the previous FIGS. 1-5, such as any type of client device, mobile phone, tablet, computing, communication, entertainment, gaming, media playback, digital camera, and/or other type of device. For example, the computing device 102 shown in FIG. 1, as well as the computing device 504 and the data service 502 (and any devices and data servers of the data service) shown in FIG. 5 may be implemented as the example device 602.

The device 602 includes communication devices 604 that enable wired and/or wireless communication of device data 606, such as user images and other associated image data. The device data can include any type of audio, video, and/or image data, as well as the images and denoised images. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device 610 and/or display device that may be integrated with the device 602. The I/O interfaces also include data input ports via which any type of data, media content, and/or inputs can be received, such as user inputs to the device, as well as any type of audio, video, and/or image data received from any content and/or data source.

The device 602 includes a processing system 612 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 614, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 614 provides storage of the device data 606 and various device applications 616, such as an operating system that is maintained as a software application with the computer-readable storage media and executed by the processing system 612. In this example, the device applications also include a object detection application 618 that implements embodiments of object detection with boosted exemplars, such as when the example device 602 is implemented as the computing device 102 shown in FIG. 1 or the data service 502 shown in FIG. 5. An example of the object detection application 618 includes the object detection application 104 implemented by the computing device 102 and/or at the data service 502, as described in the previous FIGS. 1-5.

The device 602 also includes an audio and/or video system 620 that generates audio data for an audio device 622 and/or generates display data for a display device 624. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for object detection with boosted exemplars may be implemented in a distributed system, such as over a "cloud" 626 in a platform 628. The cloud 626 includes and/or is representative of the platform 628 for services 630 and/or resources 632. For example, the services 630 may include the data service 502 as described with reference to FIG. 5. Additionally, the resources 632 may include the object detection application 104 and/or the real-adaboost technique 110 that are implemented at the data service as described with reference to FIG. 5.

The platform 628 abstracts underlying functionality of hardware, such as server devices (e.g., included in the services 630) and/or software resources (e.g., included as the resources 632), and connects the example device 602 with other devices, servers, etc. The resources 632 may also include applications and/or data that can be utilized while computer processing is executed on servers that are remote from the example device 602. Additionally, the services 630 and/or the resources 632 may facilitate subscriber network services, such as over the Internet, a cellular network, or Wi-Fi network. The platform 628 may also serve to abstract and scale resources to service a demand for the resources 632 that are implemented via the platform, such as in an interconnected device embodiment with functionality distributed throughout the system 600. For example, the functionality may be implemented in part at the example device 602 as well as via the platform 628 that abstracts the functionality of the cloud 626.

Although embodiments of object detection with boosted exemplars have been described in language specific to features and/or methods, the appended claims are not necessarily limited to the specific features or methods described. Rather, the specific features and methods are disclosed as example implementations of object detection with boosted exemplars.

The invention claimed is:

1. A computing device, comprising:
   a processor; and
   a memory configured to maintain digital images and computer-readable instructions that are executable on the processor
   to implement a face detection application that is configured to perform operations comprising:
   learning weak classifiers of an adaboost technique as exemplars taken from example images, the weak classifiers of an exemplar being partitioned into partitions associated with a positive confidence score, a negative confidence score, and an uncertain confidence score, the partitions each corresponding to a range of similarity score values that result in a determination of the associated confidence score when a similarity score generated from the exemplar is within the range;
   applying each of the weak classifiers of the adaboost technique to an image of the digital images, including generating similarity scores from the exemplars;
   determining confidence scores for each of the weak classifiers as applied to the image based on comparison of the generated similarity scores to the ranges, the determined confidence scores of a weak classifier being an indication of whether a face is detected in the image based on the weak classifier; and
   generating a face detection score that indicates whether the image includes a face by summing all of the determined confidence scores of the weak classifiers.

2. The computing device as recited in claim 1, wherein the adaboost technique is implemented as one of a standard adaboost technique or a real-adaboost technique.

3. The computing device as recited in claim 1, wherein the face is detectable in the image when varying in at least one of pose, illumination, expression, and individuality based on the exemplars taken from the example images and applied as the weak classifiers of the adaboost technique.

4. The computing device as recited in claim 1, wherein the operations further comprise:
   determining the positive confidence score, the negative confidence score, and the uncertain confidence score that are associated with the partitions of the weak classifiers of the exemplar.

5. The computing device as recited in claim 1, wherein one or more of the weak classifiers of the adaboost technique are learned by the face detection application as negative exemplars that do not include a face.

6. The computing device as recited in claim 1, wherein the operations further comprise partitioning the exemplars as domain-partitioned weak classifiers of the adaboost technique.

7. The computing device as recited in claim 6, wherein the confidence score of the weak classifier that is domain partitioned is determined by the face detection application from a coefficient of the partitions of the weak classifier, and wherein:
   a higher confidence score indicates that the face is detected in the image based on the weak classifier; and
   a lower confidence score indicates that the face is not detected in the image path based on the weak classifier.

8. The computing device as recited in claim 6, wherein:
   the positive confidence score indicates the face is detected in the image;
   the negative confidence score indicates the face is not detected in the image; and
   the uncertain confidence score indicates uncertainty as to whether the face is detected in the image.

9. A method, comprising:
   obtaining exemplars by a computing device as example faces that are collected from example images;
   learning weak classifiers by the computing device of a real-adaboost technique as the exemplars that are collected from the example images, the weak classifiers of an exemplar being partitioned into partitions associated with a positive confidence score, a negative confidence score, and an uncertain confidence score, the partitions each corresponding to a range of similarity score values that result in a determination of the associated confidence score when a similarity score generated from the exemplar is within the range;
   applying the weak classifiers of the real-adaboost technique by the computing device to an image, including generating similarity scores from the exemplars;
   determining confidence scores by the computing device for each of the weak classifiers as applied to the image based on comparison of the generated similarity scores to the ranges, the determined confidence scores of the weak classifier being an indication of whether a face of a person is detected in the image based on the weak classifier; and summing all of the determined confidence scores of the weak classifiers by the computing device to generate a face detection score that indicates whether the image includes the face.

10. The method as recited in claim 9, further comprising:

obtaining negative exemplars that do not include a face; and said learning one or more of the weak classifiers of the real-adaboost technique based on the negative exemplars.

11. The method as recited in claim 9, further comprising:

weighting the weak classifiers; and removing one or more of the weak classifiers that are least effective when said applying the weak classifiers of the real-adaboost technique to the image to determine the confidence scores for each of the weak classifiers.

12. The method as recited in claim 9, further comprising:

determining the positive confidence score, the negative confidence score, and the uncertain confidence score that are associated with the partitions of the weak classifiers of the exemplar.

13. The method as recited in claim 9, wherein:

the positive confidence score indicates the face is detected in the image;

the negative confidence score indicates the face is not detected in the image; and the uncertain confidence score indicates uncertainty as to whether the face is detected in the image.

14. One or more computer-readable hardware storage devices having instructions stored thereon that are executable by one or more processors to implement a face detection application that is configured to perform operations comprising:

learning weak classifiers of an adaboost technique as exemplars taken from example images, the weak classifiers of an exemplar being partitioned into partitions associated with a positive confidence score, a negative confidence score, and an uncertain confidence score, the partitions each corresponding to a range of similarity score values that result in a determination of the associated confidence score when a similarity score generated from the exemplar is within the range;

applying each of the weak classifiers of the adaboost technique to an image of the digital images, including generating similarity scores from the exemplars;

determining confidence scores for each of the weak classifiers as applied to the image based on comparison of the generated similarity scores to the ranges, the determined confidence scores of a weak classifier being an indication of whether a face is detected in the image based on the weak classifier; and generating a face detection score that indicates whether the image includes a face by summing all of the determined confidence scores of the weak classifiers.

15. The one or more computer-readable hardware storage devices as recited in claim 14, wherein the adaboost technique is implemented as one of a standard adaboost technique or a real-adaboost technique.

16. The one or more computer-readable hardware storage devices as recited in claim 14, wherein the face is detectable in the image when varying in at least one of pose, illumination, expression, and individuality based on the exemplars taken from the example images and applied as the weak classifiers of the adaboost technique.

17. The one or more computer-readable hardware storage devices as recited in claim 14, wherein the operations further comprise:

determining the positive confidence score, the negative confidence score, and the uncertain confidence score that are associated with the partitions of the weak classifiers of the exemplar.

18. The one or more computer-readable hardware storage devices as recited in claim 14, wherein one or more of the weak classifiers of the adaboost technique are learned by the face detection application as negative exemplars that do not include a face.

19. The one or more computer-readable hardware storage devices as recited in claim 14, wherein the operations further comprise partitioning the exemplars as domain-partitioned weak classifiers of the adaboost technique.

20. The one or more computer-readable hardware storage devices as recited in claim 19, wherein the confidence score of the weak classifier that is domain partitioned is determined by the face detection application from a coefficient of the partitions of the weak classifier, and wherein:

a higher confidence score indicates that the face is detected in the image based on the weak classifier; and a lower confidence score indicates that the face is not detected in the image based on the weak classifier.

* * * * *

UNITED STATES PATENT AND TRADEMARK OFFICE
CERTIFICATE OF CORRECTION

Page 1 of 1

PATENT NO. : 9,208,404 B2
APPLICATION NO. : 14/081489
DATED : December 8, 2015
INVENTOR(S) : Lin et al.

It is certified that error appears in the above-identified patent and that said Letters Patent is hereby corrected as shown below:

In the specification

Column 12, line 40, after "detected in the image" delete "path", therefor.

Signed and Sealed this
Twenty-ninth Day of March, 2016

Michelle K. Lee
*Director of the United States Patent and Trademark Office*